Nov. 12, 1935.   P. M. GILMER   2,021,112
PACKING RING
Filed Nov. 18, 1933
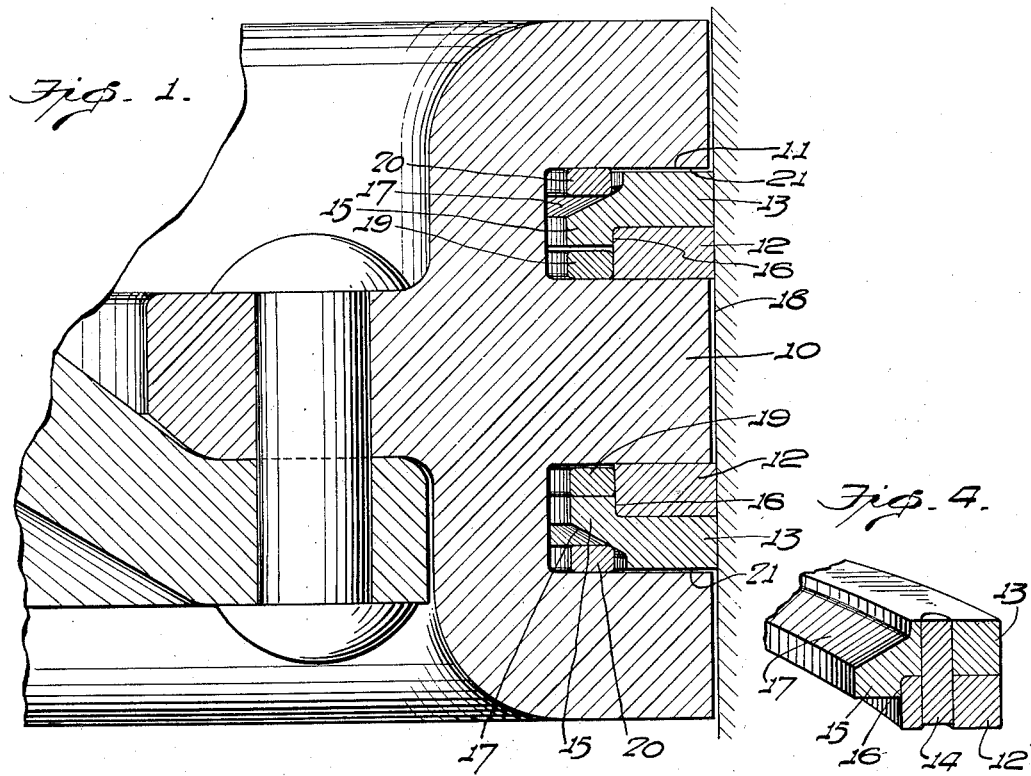
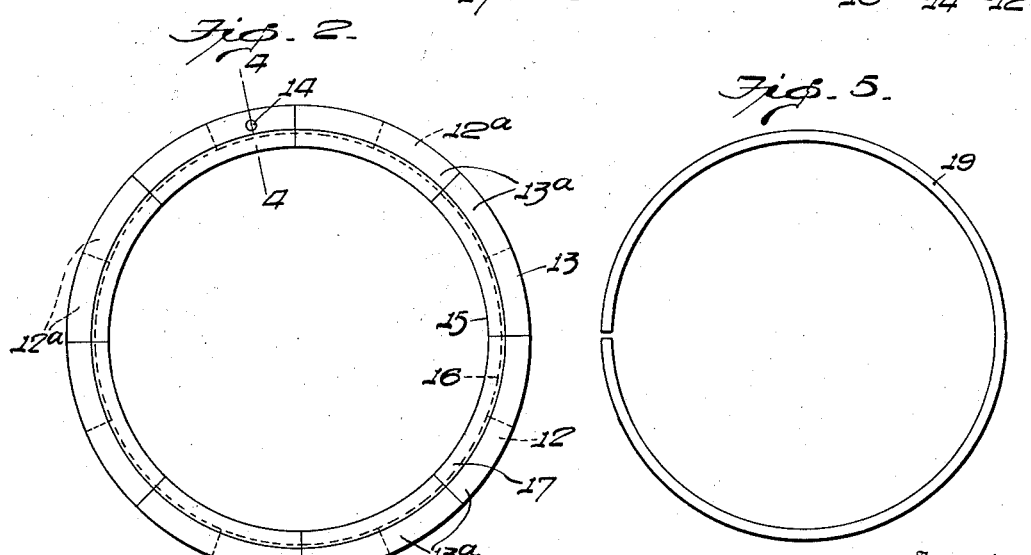
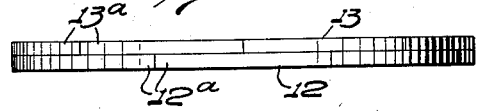
Inventor
PERCY M. GILMER
By Ernest P. Mechlin
Attorney Patented Nov. 12, 1935

2,021,112

UNITED STATES PATENT OFFICE 2,021,112

PACKING RING

Percy M. Gilmer, Roanoke, Va., assignor to Gilmer Packing Ring Corporation, Roanoke, Va., a corporation of Virginia Application November 18, 1933, Serial No. 698,700

6 Claims. (Cl. 309—25)

The invention relates to packing rings for the pistons of engines, pumps, compressors, and also for reciprocating valves of certain types.

The principal object of the invention, generally stated, is to provide a packing which will be thoroughly sealed at all times and consequently leak-proof even after prolonged use.

An important object of the invention is to provide a piston or valve packing which is purely metallic and which embodies sectional rings so constructed, arranged and related as to preclude the accumulation of carbon or other deposits between the sections.

Another object of the invention is to provide a packing ring structure including or embodying spring means which will cooperate with the sections of the ring structure not only for urging them into expanded or extended position but which will also force the ring sections into close sealing engagement, one of the spring means additionally cooperating with a side wall of the ring receiving groove and assisting in the sealing action.

A more specific object of the invention is to provide a piston or valve packing embodying superposed or contacting ring members each of which is formed of a series or plurality of sections, the sections of one being staggered with respect to those of the other, the entire assembly moreover including separate expansible spring members engaging the respective ring members and cooperating therewith for urging them into expanded position, one spring member additionally coacting with or reacting against one wall of the ring receiving groove and the adjacent ring member for forcing the two ring members together and for additionally performing a sealing action itself.

Another object is to provide a packing ring structure of this character having means engaging the two ring members for the purpose of preventing relative rotation thereof so that the joints between the segments of the ring members will never come into alinement, danger of pressure leakage from this source being thereby entirely avoided.

A still further object is to provide a packing ring structure or assembly of this character in which wear is automatically compensated for owing to the peculiar formation and relation of the parts.

An additional object is to provide a packing means of this character which will be simple and inexpensive to make, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a fragmentary cross sectional view through a piston equipped with packing rings constructed in accordance with my invention, Figure 2 is a plan view of the ring assembly alone, Figure 3 is an edge elevation thereof, Figure 4 is a detail cross section taken on the line 4—4 of Figure 2, and Figure 5 is a plan view of one of the springs.

Referring more particularly to the drawing it will be observed that in Figure 1 I have illustrated a portion of a piston 10 which might be a valve or the piston of any sort of steam or other engine, pump, compressor or the like. However, in the present instance this is intended to be a locomotive piston though it will be appreciated that there is no limitation in this respect. It is for this reason that there is no necessity for describing any particular details of the construction of the piston itself, it being sufficient to state, merely, that it is formed with peripheral grooves 11, as is customary, for the reception of the packing means which constitutes the subject matter of the present application.

In accordance with my invention, I provide within each of the grooves 11 a ring assembly including ring members indicated as a whole by the numerals 12 and 13 arranged in face to face contacting or superposed relation and each formed of segments 12a and 13a as indicated in Figure 2, the segments of one ring member being staggered with respect to those of the other so that the joints between the abutting ends of the segments of the respective ring members will be out of registration or alinement. To prevent relative rotation of the ring members 12 and 13 the simple expedient may be resorted to of providing a pin 14 passing through the ring members as clearly illustrated in Figure 4 and as also shown in Figure 2.

The ring member 12 is represented as of plain rectangular shape in cross section whereas the ring member 13 is of angular shape in cross section and of greater width than the ring member 12 in that it is formed with an inwardly extending portion 15 located within the confines of the ring member 12 and formed with a shoulder 16 abutting against the inner periphery thereof. At its side remote from the ring member 12 the ring member 13 has its inner edge beveled off or inclined as at 17. Of course, the intention is for both ring members 12 and 13 to have their outer peripheries engage against the wall 18 of the cylinder within which the piston operates. However, the inside diameter of the ring member 13 is considerably greater than the diameter of the piston at the bottom of each groove 11 so that the inner periphery of the extension 15 will be spaced from the bottom of the groove as very clearly indicated in Figure 1. It is also intended that the combined thickness of the ring members 12 and 13 be less than the width of the groove 11 so that there will be sufficient freedom of play of the entire ring assembly within its groove to avoid any possibility of binding under any circumstances.

Located within each groove 11 within the confines of the ring member 12 and reacting against the inner periphery of the latter is an expansible split ring 19 which under some circumstances may engage against the face of the extension 15 of the ring member 13. Located within the confines of the ring member 13 is a similar expansible split ring 20 so arranged as to react against the adjacent side wall of the groove 11 and against the inclined or beveled surface 17 of the ring member 13.

The mode of assembling the various parts of the assembly should be readily apparent from an inspection of the drawing without further explanation, it being self-evident that the segments of each ring member are arranged in end to end abutting relation and that the ring member 12 lies flatly against the adjacent face of the ring member 13. It is preferable that the assembly in one groove be reversed with respect to that in the other as the packing means is much more efficient when the piston is travelling in one direction rather than in the other direction. By providing two grooves 11 and the two packing ring assemblies therein adequate packing of the piston will be assured at all times regardless of the direction of movement. The spring 19 exerts an expansive or outwardly moving tendency on the ring member 12. Moreover the spring 19 bears alternately against the side face of the projecting portion 15 and the adjacent wall of the groove, there being a clearance between this spring 19 and the adjacent wall of the groove when the ring 12 abuts closely against this same side wall of the groove, and the spring 19 abutting the wall of the groove when clearance occurs between the ring 12 and the same wall of the groove. It will be observed that as the spring 20 bears against the adjacent wall of the groove and has its outer edge reacting against the beveled surface 17 of the spring member 13 this spring 20 exerts outward pressure against the ring member 13 and holds the flat face thereof in close contact with the adjacent flat face of the ring member 12, and in addition holds the shoulder 16 in firm engagement with the inner periphery of the ring member 12. As the ring members 12 and 13 thus have their flat faces urged closely together it is apparent that there is no opportunity for carbon or other matter to form or accumulate between the ring members, thereby insuring a close fit with the resultant advantage of prevention of leakage. In addition to the spring 20 forcing the ring member 13 in close contact with the face and inner periphery of the ring member 12 it also forces the ring member 12 against the wall of the groove, thereby making it impossible for the ring assembly to slap notwithstanding the fact that the combined thickness of the ring members 12 and 13 is less than the width of the groove 11. This provides a material advantage over ordinary constructions wherein it is a difficult matter to effect such accurate machining of the groove walls as to preclude ring slaps. The existence of clearance between the assembled rings and the respective walls of the groove in alternation, together with the occurrence of clearance between the spring 19 and the confronting face of the projecting portion 15 of the ring 13 is a very important consideration in this construction on account of the matter of lubrication. From actual tests it has been found that there is a remarkably slight amount of wear in this ring assembly, probably due to the fact that the oil is entrapped in the clearance which occurs at alternate sides of the ring assembly during opposite piston strokes and, when the clearance is taken up on the reverse stroke, is forced out onto the outer surfaces of the rings where they contact the cylinder wall. Attention is invited to the fact that even when the clearance occurs between the ring assembly and the walls of the grooves sealing is nevertheless effected by the springs 19 and 20 so that under no circumstances can there be leakage of oil or compression into or through the groove inwardly of the assembled rings. Even though the segments of the rings 12 and 13 become worn and spaces develop between their abutting ends as they move outwardly in accordance with wear on their outer peripheries there can still be no leakage not only as the segments of the rings 12 and 13 are staggered but for the further reason that the springs 19 and 20 always provide a seal against passage of oil or fluid pressure through the groove.

As mentioned above, it will be observed that the assembly in one groove is reversed with respect to that in the other, the purpose being to insure thorough sealing regardless of the direction of movement of the piston, the intention being that the parts be so related that the beveled edge of the ring member 13 will be the leading edge, or in other words toward the pressure side. Owing to the difference between the combined thickness of the ring members 12 and 13 and the width of the groove 11 within which they are located it is apparent that there will be a certain amount of clearance 21 between the ring member 13 and the adjacent wall of the groove but this is no disadvantage as this is sealed in two ways: first, by the spring 20, and second, by the spring 19 by virtue of contact thereof with the inner periphery of the ring member 12 and the side wall of the groove, as particularly well illustrated at the top portion of Figure 1. Moreover as the ring members 12 and 13 wear, resulting in increase of the slight gaps between the abutting ends of the segments thereof there can be no leakage owing to the action of the springs combined with the engagement of the shoulder 16 with the inner periphery of the ring member 12. It should also be mentioned that carbon cannot accumulate on the side walls of the grooves as the movement of the ring assemblies will preclude such, and it is repeated that carbon cannot enter between the ring members and cause separation thereof with resultant binding in the grooves.

From the foregoing description and a study of the drawing it will be apparent that I have thus provided a very simply constructed and inexpensive packing ring assembly for use in pistons, valves and the like involved in or forming part of machinery of different kinds. Adequate provision has been made for effectually sealing the piston so as to prevent any leakage of pressure past it and the contingency of wear has been foreseen and automatically provided for. It is thought from the foregoing that the construction, operation and advantages should be readily apparent to one skilled in the art without further explanation.

Having thus described the invention, I claim:

1. A packing assembly for a cylindrical member having a peripheral groove, comprising a pair of ring members located in face to face contacting relation and located within the groove, one ring member having a projecting portion engaging against the inner periphery of the other ring member and terminating short of the far lateral face thereof and further having one inner edge beveled, an expansible spring located within the groove and reacting against one wall thereof and against said beveled edge, and a second spring member within the groove seated between said projecting portion and the adjacent side wall of the groove and bearing against the inner periphery of said other ring member.

2. A packing assembly for disposition within a peripheral groove in a cylindrical member, comprising a pair of contacting ring members located within the groove, one ring member having a projecting portion located within the confines of and bearing against the inner periphery of the other ring member and having one inner edge beveled off, an expansible split spring ring located within the groove and bearing against one side wall thereof and against said beveled edge, and a second expansible split ring located and movable axially within the groove between the lateral face of said projecting portion and the adjacent side wall of the groove and bearing outwardly against the inner periphery of said other spring member.

3. A packing assembly for disposition within a peripheral groove in a cylindrical member, comprising a pair of contacting ring members located within the groove, one ring member having a projecting portion located within the confines of and bearing against the inner periphery of the other ring member and terminating short of the far face thereof and having one inner edge beveled off, an expansible split spring ring located within the groove and bearing against one side wall thereof and against said beveled edge, and a second expansible split ring located within and having a thickness less than the width of the groove between the face of said projecting portion and the adjacent side wall of the first mentioned groove and bearing outwardly against the inner periphery of said other spring member, and means parallel with the axis of the rings securing them against relative rotation.

4. A packing assembly for disposition within a peripheral groove in a cylindrical member adapted for operation within a cylinder, comprising a pair of superposed ring members arranged in contacting face to face relation, one ring member having an annular longitudinally projecting portion engaged against the inner periphery of the other ring member and having one inner edge beveled off, the combined thickness of both ring members being less than the width of the groove to define clearance, an expansible split spring ring located within the groove and bearing against one side wall thereof and against said beveled edge and constituting sealing means for said clearance, and a second expansible split spring ring located within and of less thickness than the width of the groove between the lateral face of said projecting portion and the adjacent side wall of the first mentioned groove and bearing outwardly against the inner periphery of said other ring member, said second named spring being of less thickness than the space between the lateral face of said projecting portion and the adjacent side wall of the groove.

5. A packing assembly for disposition within a peripheral groove in a cylindrical member adapted for operation within a cylinder, comprising a pair of superposed ring members arranged in contacting face to face relation, one ring member having an annular longitudinally projecting portion engaged against the inner periphery of the other ring member and having one inner edge beveled off, the combined thickness of both ring members being less than the width of the groove to define clearance, an expansible split spring ring located within the groove and bearing against one side wall thereof and against said beveled edge and constituting sealing means for said clearance, and a second expansible split spring ring located within and of less thickness than the width of the groove between the lateral face of said projecting portion and the adjacent side wall of the groove and bearing outwardly against the inner periphery of said other ring member, said ring members abutting alternately against the sides of said groove and the second named spring bearing alternately against the lateral face of said projecting portion and the adjacent side wall of the groove when the cylindrical member is moved in opposite directions within a cylinder.

6. A packing assembly for disposition within a peripheral groove in a cylindrical member adapted for operation within a cylinder, comprising a pair of superposed ring members arranged in contacting face to face relation, one ring member having an annular longitudinally projecting portion engaged against the inner periphery of the other ring member and having one inner edge beveled off, the combined thickness of both ring members being less than the width of the groove to define clearance, an expansible split spring ring located within the groove and bearing against one side wall thereof and against said beveled edge and constituting sealing means for said clearance, a second expansible split spring ring located within and of less thickness than the width of the groove between the lateral face of said projecting portion and the adjacent side wall of the groove and bearing outwardly against the inner periphery of said other ring member, said ring members abutting alternately against the sides of said groove and the second named spring bearing alternately against the lateral face of said projecting portion and the adjacent side wall of the groove when the cylindrical member is moved in opposite directions within a cylinder, and said first named spring bearing always against the adjacent side wall of the groove.

PERCY M. GILMER.